United States Patent
Bono et al.

(10) Patent No.: US 10,409,687 B1
(45) Date of Patent: Sep. 10, 2019

(54) MANAGING BACKING UP OF FILE SYSTEMS

(71) Applicant: EMC Corporation, Hopkinton, MA (US)

(72) Inventors: Jean-Pierre Bono, Westborough, MA (US); Himabindu Tummala, South Grafton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 467 days.

(21) Appl. No.: 14/675,131

(22) Filed: Mar. 31, 2015

(51) Int. Cl.
*G06F 16/00* (2019.01)
*G06F 11/14* (2006.01)
*G06F 11/20* (2006.01)
*G06F 16/11* (2019.01)

(52) U.S. Cl.
CPC ...... *G06F 11/1435* (2013.01); *G06F 11/1451* (2013.01); *G06F 11/1464* (2013.01); *G06F 11/2058* (2013.01); *G06F 11/2069* (2013.01); *G06F 16/11* (2019.01); *G06F 2201/80* (2013.01); *G06F 2201/84* (2013.01)

(58) Field of Classification Search
CPC ............. G06F 11/1435; G06F 11/2069; G06F 11/2058; G06F 11/1464; G06F 11/1451; G06F 2201/84; G06F 2201/80; G06F 16/11
See application file for complete search history.

(56) References Cited

U.S. PATENT DOCUMENTS

| | | | | |
|---|---|---|---|---|
| 7,039,663 B1* | 5/2006 | Federwisch | ......... | G06F 11/1451 |
| 7,631,155 B1* | 12/2009 | Bono | ................... | G06F 3/0608 |
| | | | | 707/999.202 |
| 7,831,789 B1* | 11/2010 | Per | ..................... | G06F 11/1451 |
| | | | | 707/625 |
| 7,873,601 B1* | 1/2011 | Kushwah | ............ | G06F 11/1451 |
| | | | | 707/654 |
| 8,990,162 B1* | 3/2015 | Kushwah | ............ | G06F 11/1469 |
| | | | | 707/646 |
| 9,411,526 B1* | 8/2016 | Broido | .................... | G06F 3/067 |
| 2004/0268068 A1* | 12/2004 | Curran | ................ | G06F 11/1451 |
| | | | | 711/162 |
| 2006/0075294 A1* | 4/2006 | Ma | ..................... | G06F 11/1451 |
| | | | | 714/13 |
| 2006/0218135 A1* | 9/2006 | Bisson | .............. | G06F 17/30368 |
| 2012/0259815 A1* | 10/2012 | Olson | ................. | G06F 11/1458 |
| | | | | 707/649 |

* cited by examiner

*Primary Examiner* — Alexander Khong
(74) *Attorney, Agent, or Firm* — Krishnendu Gupta; Deepika Bhayana

(57) ABSTRACT

A method is used in managing backing up of file systems. A portion of a file system that has changed since a last backup is determined. The file system includes a set of directory hierarchies. Each directory hierarchy includes a set of directories. Each directory of the set of directories includes a set of files. The portion of the file system is determined based on blocks of the file system that have changed since the last backup. The changed blocks are identified based on changes between at least two snapshot copies of the file system. Based on the changed blocks, a set of inodes of the file system that has changed since the last backup is determined. Based on the determination, a list of changed files associated with the set of inodes for performing backup of changed files of the file system is determined.

14 Claims, 10 Drawing Sheets

MANAGING BACKING UP OF FILE SYSTEMS

BACKGROUND

Technical Field

This application relates to managing backing up of file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

File-based data storage systems include programming and hardware structures to provide file-based access to file systems. File-based data storage systems are sometimes referred to as Network Attached Storage or NAS systems. Such systems may support NFS (Network File System), CIFS (Common Internet File System), SMB (Server Message Block), and/or other file-based protocols. With file-based protocols, host computers (hosts) perform read and write operations to files by specifying particular file systems, paths, and file names. Internally to the data storage system, file system directories map the files specified by host commands to particular sets of blocks on internal volumes, which themselves are derived from disk drives or electronic flash drives. The data storage system accesses the mapped locations and performs the requested reads or writes. An example of a file-based data storage system is the Celerra® system and VNX® system from EMC Corporation of Hopkinton, Mass.

Data storage systems may utilize a file-based representation of block-oriented storage objects that are exposed to external users, such as host computers accessing the data storage system via a network. For example, a logical unit of storage or LUN is a block-oriented storage object visible as a block-oriented storage device to a host computer. Internally, however, the storage system may map the LUN into a file of an internal file system, and then manage access and other aspects of the LUN by corresponding operations on the mapped file. This organization can help enhance efficiency of processing storage operations. Additionally, in current systems employing virtual computing technology, units of virtualized storage for virtual machines may be represented as files of a distributed file system used by a host computer and one or more network-attached storage (NAS) systems. Within a host, accessing a virtualized storage unit requires a mapping to a file of the distributed file system, and within the storage system the file is mapped to underlying physical storage that contains the data of the virtualized storage unit. This mapping may be a multi-level mapping that may include use of a separate internal file system. Both the distributed file system and the internal file system may be described as "hosting" the virtualized storage units.

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems implement snapshot technology (also referred to herein as "replication technology") to protect the data they store. For example, such a data storage system may present a file system to a client machine. The client machine accesses the file system and can make changes to its contents over time. To protect the file system and its state at various points in time, the data storage system may implement a snapshot policy and take snapshots, or "snaps," of the file system at regular intervals or in response to user commands or particular events. Each snapshot provides a point-in-time version of the file system which users of client machines can access to restore from a previous version of the file system.

Incremental backup of files in a file system is a well-known technique for enabling recovery of files that have become corrupted or entirely lost from data storage due to disk drive failure or destruction from a disaster. The technique begins by performing a full backup of the file system by copying all of the files in the file system to backup storage such as disk drives. Then, at periodic intervals or when requested by a user, the file system is scanned for files that have changed since the last backup, and each file that has changed since the last backup is copied to the backup storage.

Typically the file system tree is scanned in a depth-first fashion, starting at the root directory, to find files that have changed since the last backup and to copy each of these changed files to the backup storage. For example, for each file visited during the depth-first scan, the time of the start of the scan for the last backup is compared to a modification time attribute (mtime) and a creation time attribute (ctime) to determine whether or not the file's data or metadata has been changed since the time of the last backup. If so, then the changed file is copied to the backup storage. The depth-first scan is continued until the entire file system tree is scanned. The incremental backup is finished when all of the changed files have been copied to the backup storage.

SUMMARY OF THE INVENTION

A method is used in managing backing up of file systems. A portion of a file system that has changed since a last backup is determined. The file system includes a set of directory hierarchies. Each directory hierarchy includes a set of directories. Each directory of the set of directories includes a set of files. The portion of the file system is determined based on blocks of the file system that have changed since the last backup. The changed blocks are identified based on changes between at least two snapshot copies of the file system. Based on the changed blocks, a set of inodes of the file system that has changed since the last backup is determined. Based on the determination, a list of changed files associated with the set of inodes for performing backup of changed files of the file system is determined.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
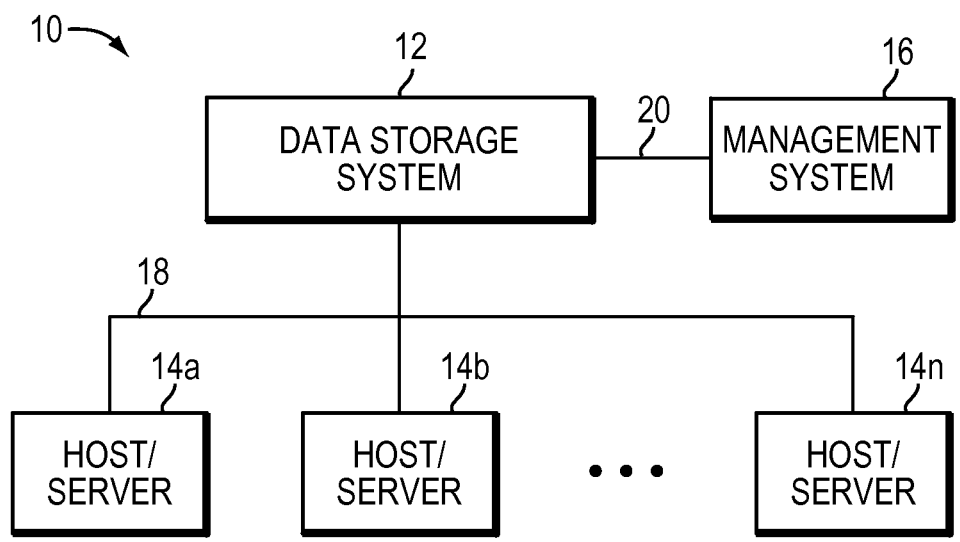
FIGS. 1-3 are examples of an embodiment of a computer system that may utilize the techniques described herein.

Described below is a technique for use in managing backing up of file systems, which technique may be used to provide, among other things, determining a portion of a file system changed since a last backup, where the file system includes a set of directory hierarchies, each directory hierarchy including a set of directories, each directory of the set of directories including a set of files, where the portion of the file system is determined based on blocks of the file system changed since the last backup, where the changed blocks are identified based on changes between at least two snapshot copies of the file system, based on the changed blocks, determining a set of inodes of the file system changed since the last backup, and based on the determination, determining a list of changed files associated with the set of inodes for performing backup of changed files of the file system. Further, in at least one embodiment of the current technique, the list of changed files are provided for backup in the same ordered arrangement in which the changed files appear on a file system hierarchy to which the changed files belong to.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A pool may include a set of storage tiers. A storage tier may include storage devices of similar or same performance capabilities and cost. However, a pool may have storage devices of different performance capabilities and costs. Both pool and storage tier contain slices. A slice may be considered the smallest element that can be tracked and moved. A storage tier or a storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

File system mapping logic in a storage system provides a thin provisioning service by adding fixed sized slices to a file system when the file system needs storage space to write data. In such a case, when a file system requires a slice, the file system sends a request to provision the slice to a slice manager component of a storage system. A slice request framework manages requests to provision slices. Thus, as described above herein, virtual address space of a file system may be apportioned into fixed sized sections or chunks, each chunk being a slice.

At periodic times or when invoked by a client, a backup facility or a backup server creates an incremental backup copy of a file system. Each incremental backup copy includes copies of the files that have changed since the time of the last backup. For example, a first incremental backup includes copies of all of the files of the file system that have changed since the creation time of the full backup copy. A second incremental backup includes copies of all of the files of the file system that have changed since the start time of the first incremental backup.

The present invention recognizes that there are disadvantages as well as advantages associated with the conventional method of incremental backup of files in a file system. The disadvantages have become more pronounced as file systems have grown in size and users have become less diligent in removing old and infrequently accessed files from on-line storage due to the ever decreasing cost of storage. Incremental backups, however, are still performed at frequent intervals. Consequently, in a conventional system, a greater amount of time is being spent scanning the file system for files that have changed since the last backup. Further, in such a conventional system, it is difficult or impossible to complete an incremental backup of a large file system (e.g., hundreds of Terabytes in size, millions of files in the file system) within a short backup time window as a large number of files are evaluated for determining changed files for the incremental backup. Thus, in such a conventional system, the amount of time it takes to complete an incremental backup depends upon the total number of files in a file system as each file is evaluated to determine whether such file has changed. Further, in such a conventional system, this increase in scanning time interferes with concurrent client access to file system directories and may also lead to increased processing load or inefficiency in the backup process due to the handling of files that are changed during the scanning process. In view of these problems, it is desired to accelerate the incremental backup process so that an incremental backup does not require a full scan of a file system tree, yet changed files are still backed up in the order that they appear in a depth-first scan of the file system in order to satisfy user expectations. Thus, one of the goals of the present invention is to provide an incremental backup technique that may be completed within a short backup time window configured by a user and the amount of time it takes to complete the incremental backup becomes dependent upon the number of changed files in a file system.

By contrast, in at least some implementations in accordance with the technique as described herein, the current technique uses an existing snap differential technology to determine changed blocks at a volume level for a file system and perform a series of steps to map the changed blocks to a set of changed files and directories for backup without having to traverse entire file system hierarchy. Thus, in at least one embodiment of the current technique, an incremental backup is performed for a file system in such a way that the amount of time it takes to complete the incremental backup depends upon the number of files that have changed since a last backup instead of being based upon the total number of files in the file system. In at least one embodiment of the current technique, the snap differential mechanism is used to evaluate differences between two replicas (also referred to herein as "snaps") of a file system in order to determine which data blocks have changed at a volume level since a last backup. Thus, in at least one embodiment of the current technique, the amount of time it takes to complete an incremental backup is proportional to the number of files of a file system that have changed since a last backup which is determined using the snap differential mechanism and independent of the total number of files in the file system. In at least one embodiment of the current technique, an incremental backup for a large file system may be completed in a short backup time window configured by a user or system.

In at least some implementations in accordance with the current technique as described herein, the use of the managing backups of file systems technique can provide one or more of the following advantages: improving efficiency of a data storage system by efficiently processing files of a file system for performing a backup, improving performance of a backup process by determining changed files using the snap differential mechanism, and reducing the amount of time it takes to backup files of a file system by efficiently determining a list of changed files in the file system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Figure 2:
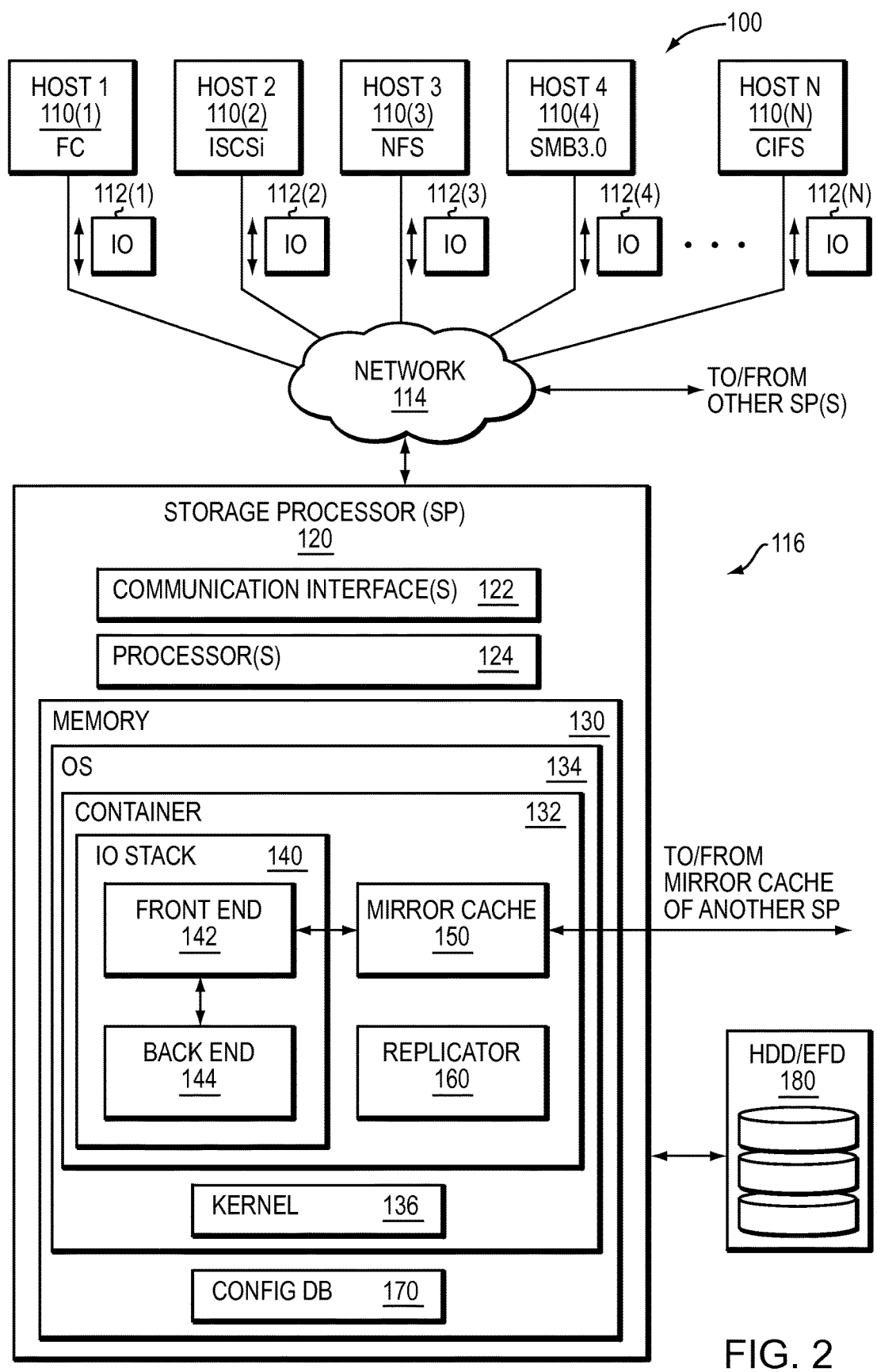

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system. Referring now to FIG. 2, shown is an example of an embodiment of a computer system that may be used in connection with performing the technique or techniques described herein.

FIG. 2 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 2, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user space execution context within the operating system 134. In various examples, the memory 130 may include multiple containers like the container 132, with each container providing its own isolated user space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 2, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 2 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 3:
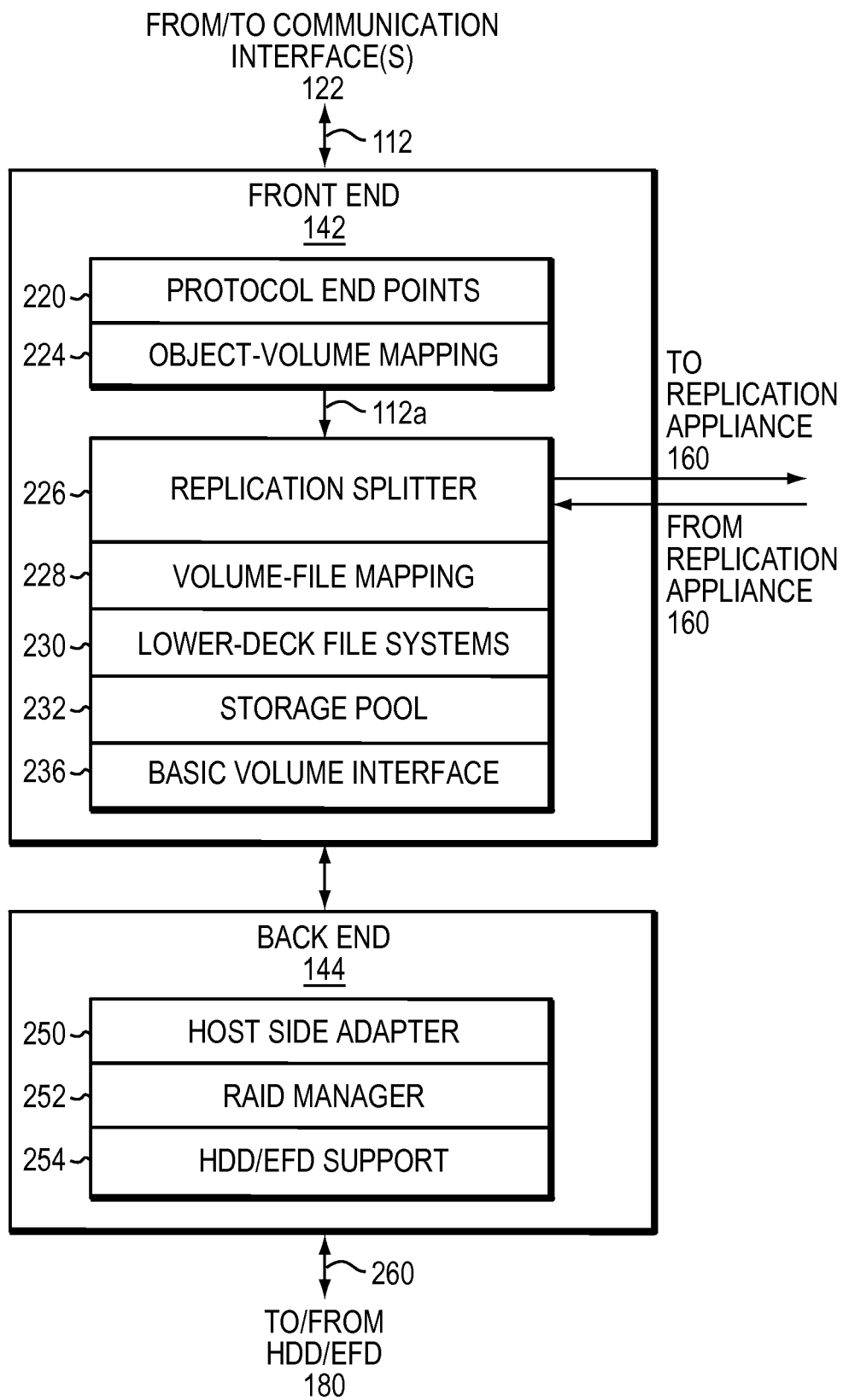

FIG. 3 shows the front end 142 and back end 144 of the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 2, the host side adapter 250 may be omitted or made to perform no operation.

Continuing to the front end 142, the basic volume interface 236 provides an interface to the back end 144 for instances in which the front end 142 and back end 144 are run on different hardware. The basic volume interface 236 may also be inactive in the arrangement shown in FIG. 2.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files. The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances includes other files that store snaps of the file that stores the data object. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective data objects, such as LUNs, host file systems, and vVOLs. Mapping underlying volumes to host-accessible LUNs may simply involve a remapping operation from a format compatible with the internal volume to a format compatible with the LUN. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems, file-based vVOLs, and VMDKs) using NFS, CIFS, or SMB 3.0, for example. In operation, the IO stack 140 receives an IO request 112 specifying data to be written to a particular data object. The object-volume mapping 224 maps the IO request 112 to a block-based request 112a directed to an internal volume. The volume-file mapping 228 maps the block-based request 112a to one that is directed to a particular file of a lower-deck file system, and the back end 144 and storage 180 process the IO request by writing the specified data to actual media.

Figure 4:
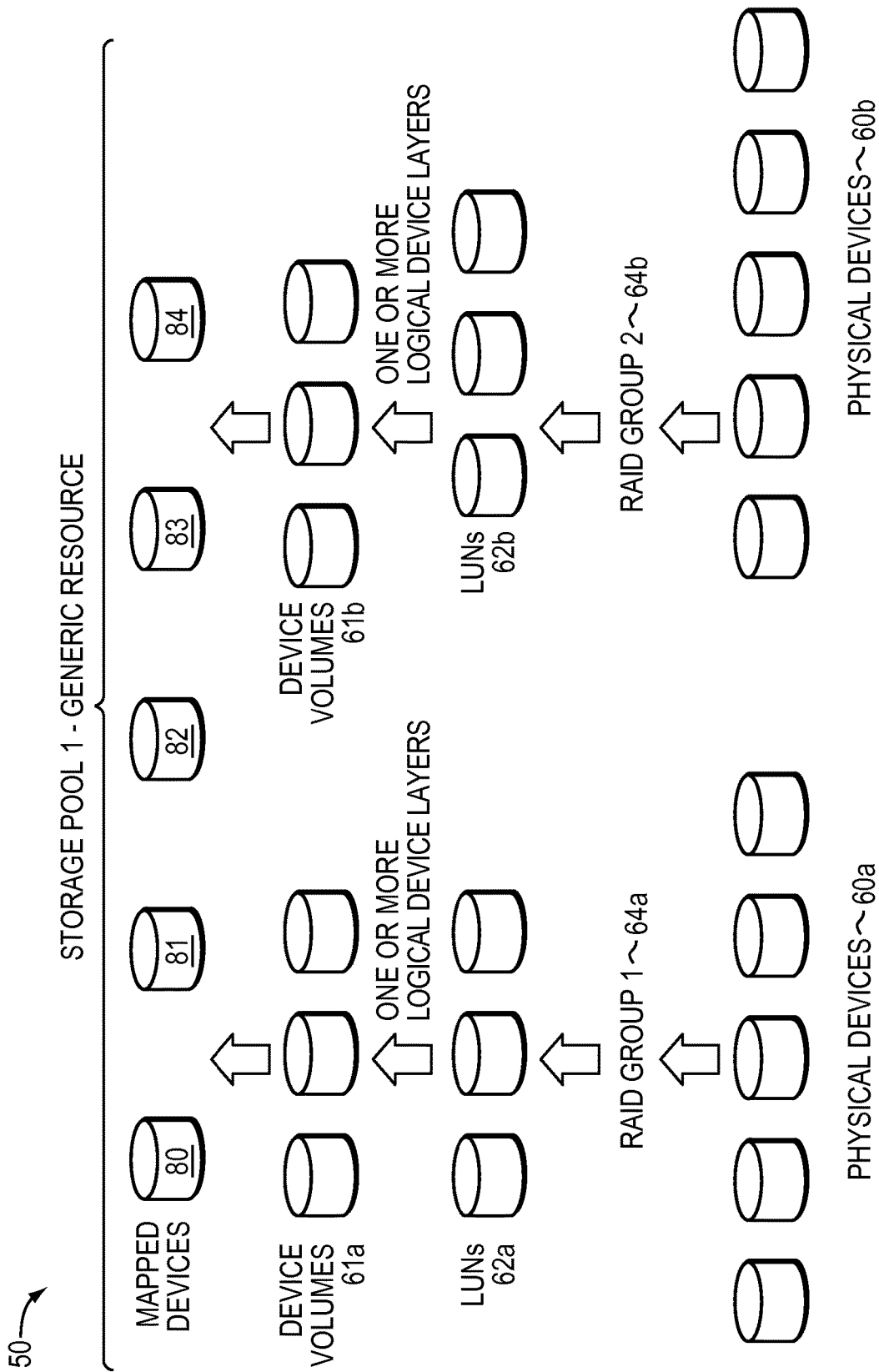
FIG. 4 is an example illustrating storage device layout.

Referring to FIG. 4, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 5:
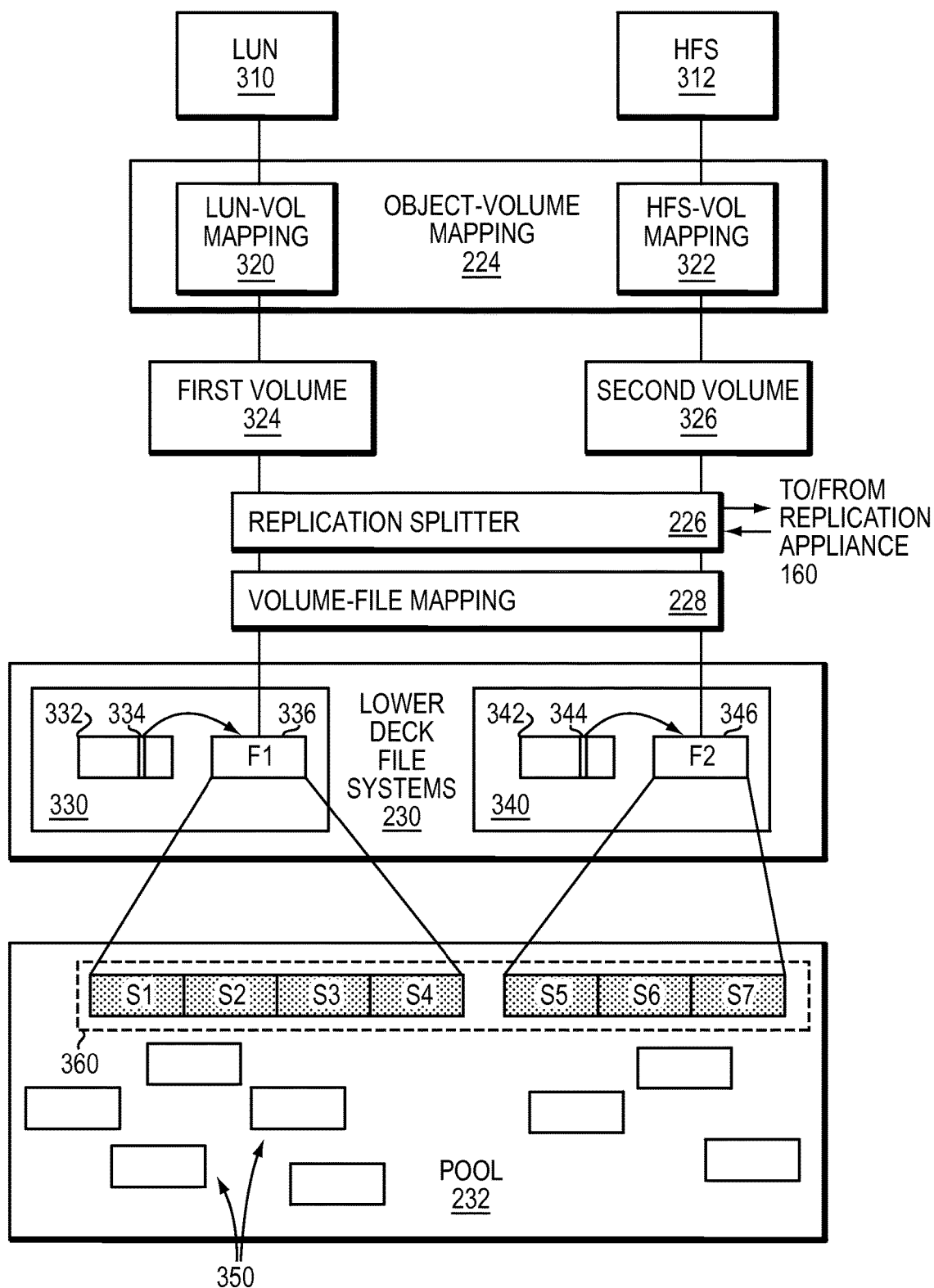
FIGS. 5-10 are diagrams illustrating in more detail components that may be used in connection with techniques herein.

FIG. 5 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored, and may thus be accessed as metadata to identify the locations of the file 346.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312.

As shown, the storage pool 232 allocates slices 360 for providing storage for the first file 336 and the second file 346. In the example show, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

Figure 6:
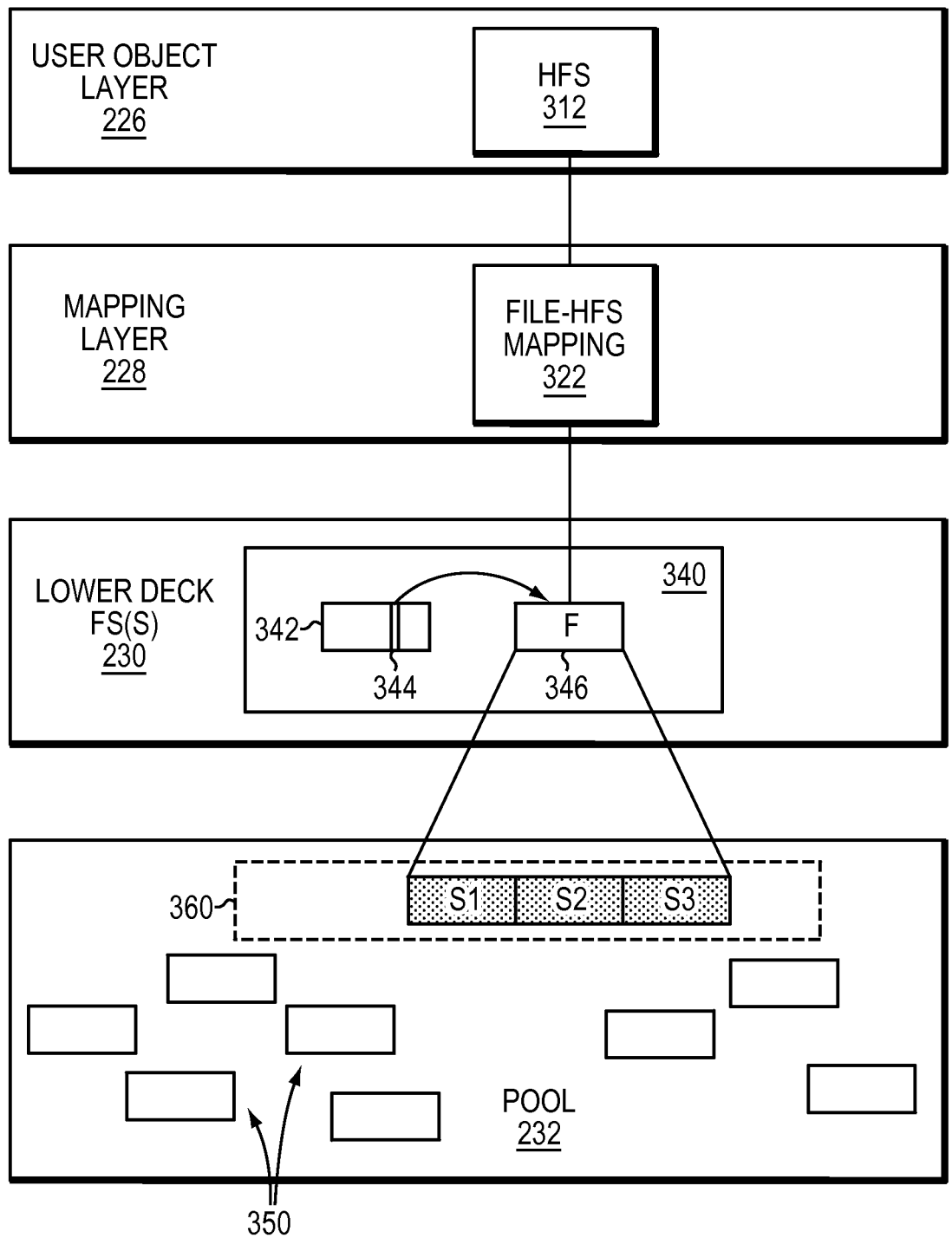

FIG. 6 shows portions of the front end 142 in additional detail. Here, the user object layer 226 includes a representation of an HFS (host file system) 312, and the mapping layer 228 includes a file-to-HFS mapping 322. The file-to-HFS mapping 322 maps the HFS 312 to a file F (346). Through the file-to-HFS mapping 322, any file or directory of the HFS 312 is mapped to a corresponding set of blocks within the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 7:
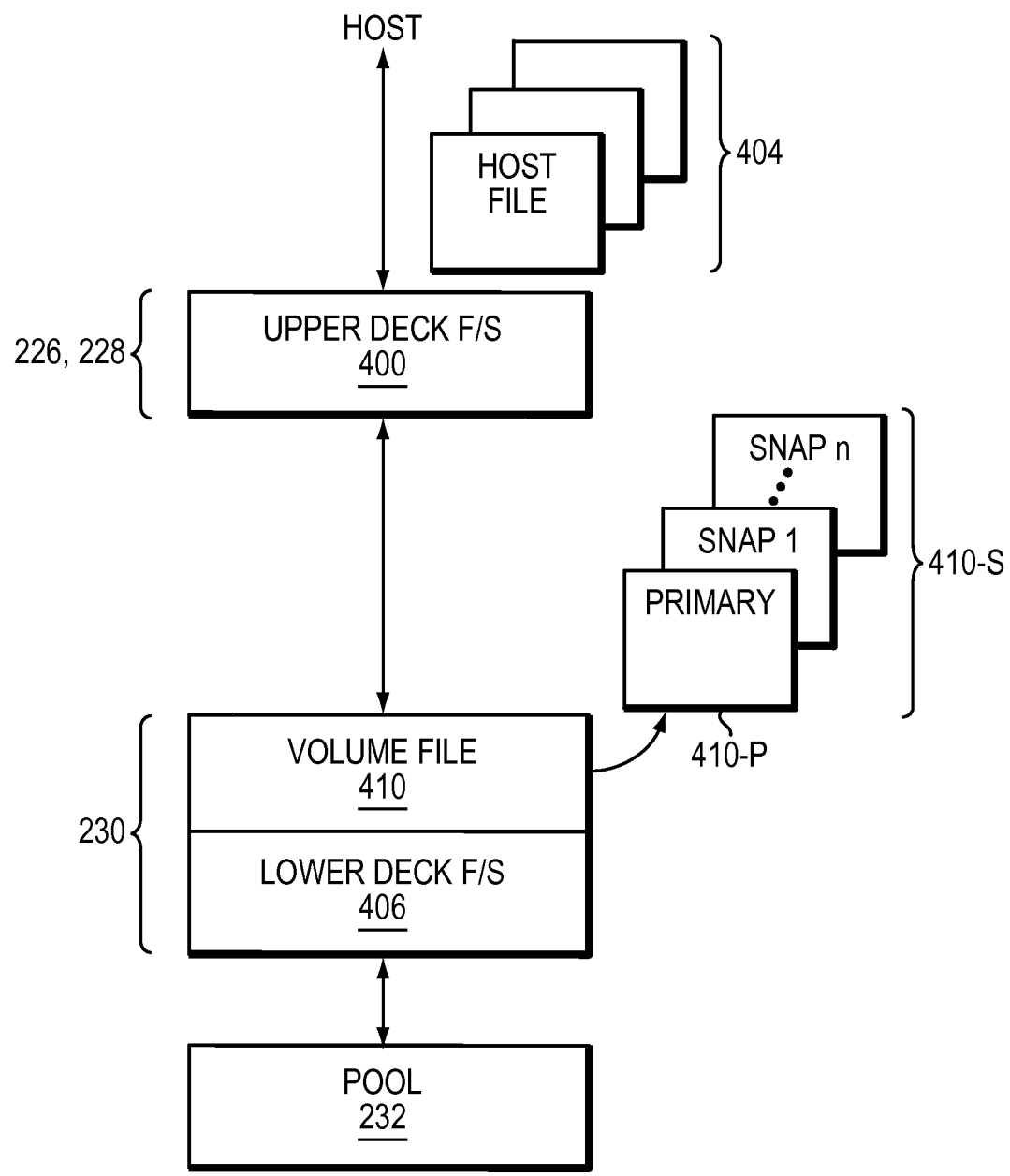

FIG. 7 shows another view of the organization of the data storage system useful for describing certain functionality as presented below. In FIG. 7, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400. The volume file 410 may be the subject of point-in-time copying by which snapshots or "snaps" are created and used for various purposes. The active production file is referred to as the "primary" volume file 410-P, while the snaps are shown as snapshot files 410-S.

As described more below, the arrangement of FIG. 7 uses so-called "thin provisioning", which refers to the manner in which slices of the pool 232 become allocated or assigned to the upper-deck file system 400 as underlying physical storage for file contents. In the present description, "thin provisioning" includes the following features:

1. Underlying storage is not fully reserved, meaning that the configured size of the upper-deck file system 400 is greater than the amount of storage in the pool 232 reserved for use by the upper-deck file system 400 to the exclusion of other potential users (e.g., other file systems 230).

2. Underlying storage is dynamically allocated, meaning that slices from the pool 232 are assigned for actual use by the upper-deck file system 400 as its contents grow in response to the writing of data.

3. The volume file 410 is sparse, i.e., only incompletely containing actual underlying storage. Slices that are cut from the volume file 410 for use by the upper-deck file system 400 are actually thinly provisioned, and corresponding storage is allocated from the lower-deck file system 406 only when the volume file 410 is effectively written into by the upper-deck file system 400. Said differently, a slice may have been provisioned into the upper-deck file system 400 and yet have no storage associated to it from the lower-deck file system 406.

Figure 8:
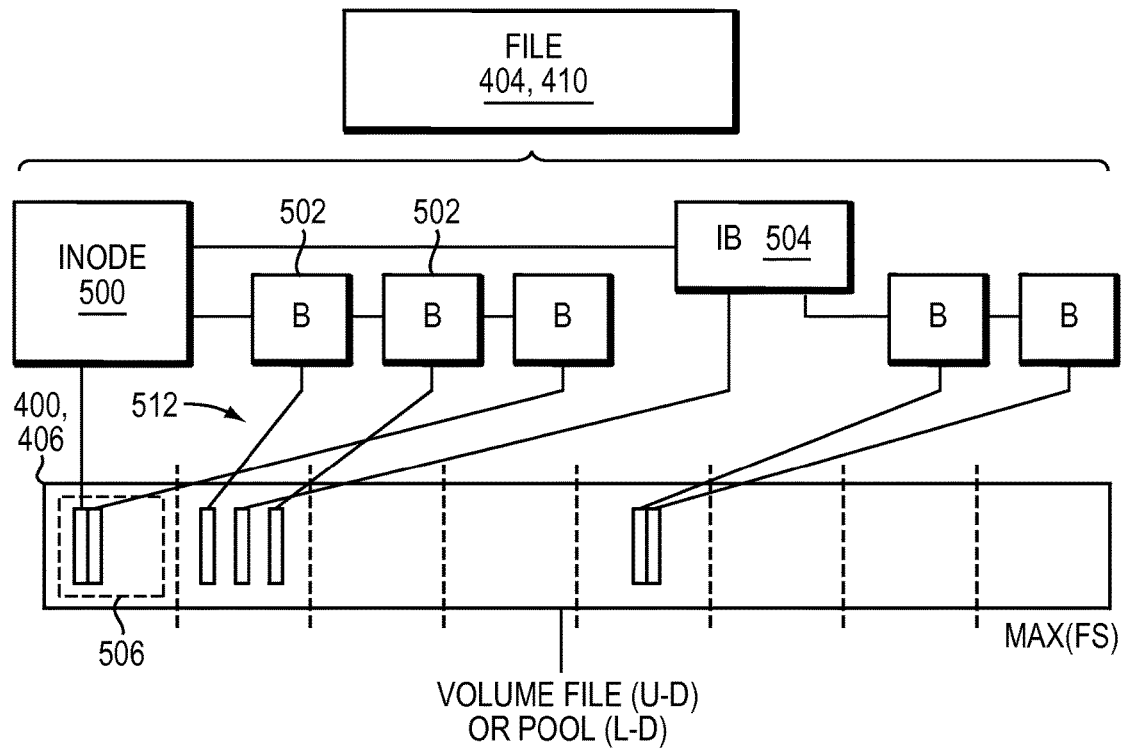

FIG. 8 illustrates certain details regarding files and file systems, applicable at both the upper layer (404, 400 in FIG. 6) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 8 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

FIG. 8 shows what is referred to as a "mapped" mode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other mode. For the lower-deck file system 406, however, mapped mode is one of potentially multiple distinct operating modes, possible due to the internal nature and specialized use of the lower-deck file system 406 in the data storage system. The remaining description focuses on mapped mode operation of the lower-deck file system 406 in particular.

In FIG. 8 the mapping is indicated by generally crossing lines 512 extending between the blocks 502 of a volume file 410 and their locations in the lower-deck file system 406. In mapped mode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or sequentially ordered relative to existing areas where blocks 502 of the file are already stored.

With respect to the lower-deck file system 406 in particular, mapped mode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating mode in which predetermined calculations can be used instead of Inode/IB traversals.

It should also be noted that mapped mode of operation of the lower-deck file system 406 may include deduplication functionality by which duplicate blocks in a deduplication domain including the upper-deck file system 400 are stored as a single shared block and corresponding block pointers in the lower-deck file system 406.

Figure 9:
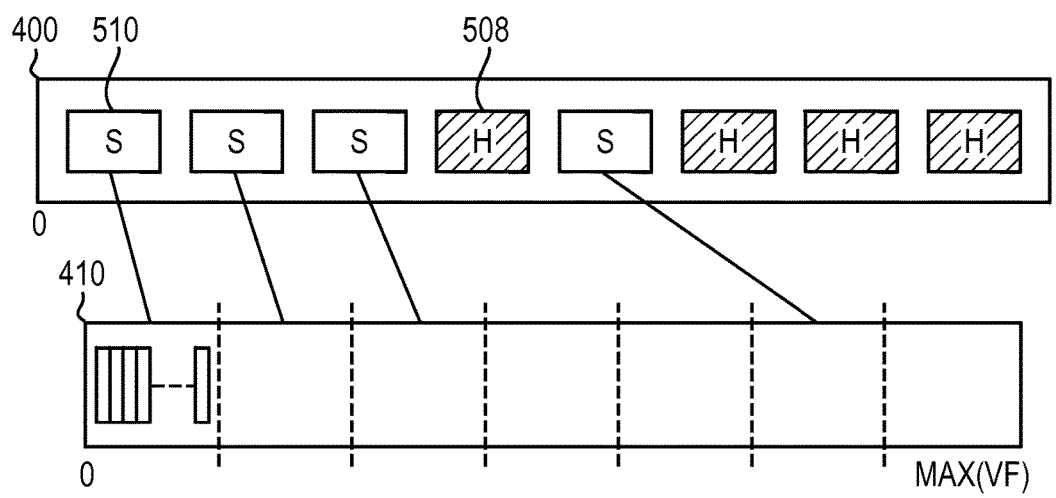

FIG. 9 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Slices 510 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs. The slice manager may be responsible for implementing a slice allocation policy and/or algorithm. For example, the slice manager may receive slice allocation requests, and maintain relevant statistical information regarding slices by using a slice allocation table.

Figure 10:
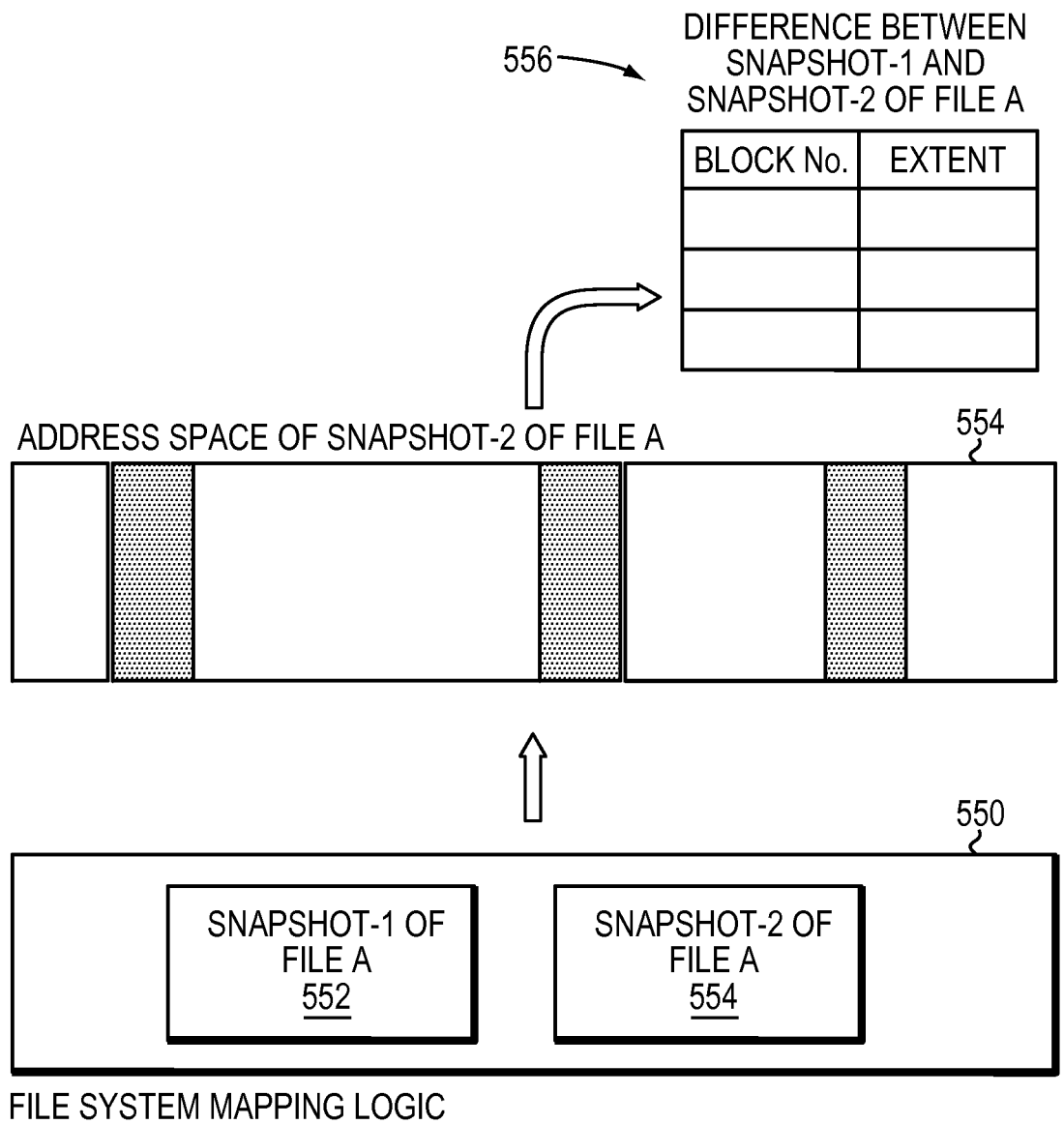

Referring to FIG. 10, shown is a detailed representation of components that may be included in an embodiment using the techniques described herein. With reference also to FIGS. 1-9, the snapshot facility maintains the state of a file system existing at the snapshot creation time by keeping a record of whether or not each data block of the file system has been changed since the snapshot creation time. For each write operation upon a file system, if a data block being written to has not been changed since the snapshot creation time, then this "old" value of this data block is saved before a "new" value is written to the data block. For creation of a full backup copy of a file system, the snapshot facility gives a backup facility read-only access to a snapshot copy of the file system by accessing the "old" values of file system data blocks that have changed since the snapshot creation time. There are various ways that a snapshot facility may keep a record of the changed file system data blocks, and save the "old" values of the changed file system data blocks. A specific example is described in Bixby et al. U.S. Pat. No. 7,555,504 issued Jun. 30, 2009, entitled Maintenance of a File Version Set Including Read-Only and Read-Write Snapshot Copies of a Production File, incorporated herein by reference.

Further, a snapshot copy facility stores snapshot copies of a production, file system. The snapshot copy facility receives a request for the difference between a specified older snapshot copy and a specified younger snapshot copy, and responds by returning the difference between the older snapshot copy and the younger snapshot copy. In a preferred implementation, the snapshot copy facility has an index for each snapshot copy for indicating blocks of data in the production file system that have changed between the snapshot copy and a next snapshot copy of the production file system. The indices are scanned for a sequence of the snapshot copies to determine the blocks that have changed, and the snapshot copy facility returns the block numbers and data in the younger snapshot copy for the blocks that have changed. In view of the above, there has been described a snapshot copy facility including a snap differential technique that stores a plurality of snapshot copies of a production file system. Each of the snapshot copies is a prior state of the production file system at a respective point in time. The snapshot copy facility receives a request for the difference between a specified older snapshot copy and a specified younger snapshot copy, and responds by returning the difference between the older snapshot copy and the younger snapshot copy.

The snap differential technique referred in the paragraphs above herein to determine changed blocks between two snapshot copies is described in U.S. Pat. No. 7,567,991 for "Replication Of Snapshot Using a File System Copy Differential" issued on Jul. 28, 2009, which is incorporated herein by reference.

Further, each file has a logical address space for addressing data in the file. In a typical general purpose digital computer or in a file server or in a storage system, an operating system program called a file system manager assigns each file a unique numeric identifier called a "file handle," and also maps the logical address space of the file to a storage address space of at least one data storage device such as a disk drive.

Typically a human user or an application program accesses data in a file by requesting the file system manager to locate the file. After the file system manager returns an acknowledgement that the file has been located, the user or application program sends requests to the file system manager for reading data from or writing data to specified logical addresses of the file.

Typically the user or application program specifies an alphanumeric name for the file to be accessed. The file system manager searches one or more directories for the specified name of the file. A directory is a special kind of file. The directory includes an alphanumeric name and an associated file handle for each file in the directory. Once the file system manager finds the specified name in the directory, it may use the file handle associated with the specified name for reading or writing data to the file.

For referencing a large number of files, the files typically are grouped together in a file system including a hierarchy of directories. Each file is specified by an alphanumeric pathname through the hierarchy. The pathname includes the name of each directory along a path from the top of the hierarchy down to the directory that includes the file. To locate the file, the user or application program specifies the pathname for the file, and the file system manager searches down through the directory hierarchy until finding the file handle. The file system manager may return the file handle to the user or application program with an acknowledgement that the file has been located. The user or application program includes the file handle in subsequent requests to read or write data to the file.

The inode of a file may be mapped to the file pathname of the file by a mechanism described in U.S. patent application Ser. No. 13/461,316 for "Inode to Pathname Support With a Hard Link Database" filed on May 1, 2012, which is incorporated herein by reference.

In at least one embodiment of the current technique, a snapshot copy 554 of a file system may be created before starting backup of the file system such that file system mapping logic 550 determines a list of blocks 556 that have changed between the snapshot copy 554 created before the backup and a snapshot copy 552 that may been created previously. Further, the list of changed blocks 556 is mapped to a list of file and directories that have changed between the two snapshot copies 552, 554. Following steps are performed for mapping the list of changed blocks 556 to a list of changed files and directories. First, for each block of a list of changed blocks 556, the slice number and the block offset within the slice corresponding to a changed block is determined by querying a slice allocation table managed by a slice manager of a storage system. Further, upon determining the slice number for a changed block, the root slice of a sparse volume that includes such slice is evaluated to determine the offset within the sparse volume at which such slice is located. Further, the file system block number for the changed block is determined by using the offset of the slice within the sparse volume. Further, upon determining the file system block number for the changed block, the file system block number is mapped to the logical address space of the file system to determine whether the file system block number is mapped to inode subspace within the logical address space of the file system. File system block numbers that are not mapped to the inode subspace within the logical address space of a file system are not processed further for backing up the file system. Thus, from the list of changed blocks 556, a set of file system blocks that map to inodes of files are processed further to determine a list of changed files for performing an incremental backup for the file system. Further, each file system block number may be mapped to an inode block which may include a set of inodes. Further, each inode included in an inode block mapped to a file system block number is evaluated to determine whether the inode has changed since a last backup by evaluating timestamp information stored in each inode. As a result, a list of inodes are determined that have changed since a last backup. Further, each inode of the list of inodes is mapped to a file pathname by using the technique to map the inode to the file pathname described above herein. Thus, a list of file pathnames determined by performing steps described above herein is provided to a backup facility for performing backup of changed files. Further, the steps described above are performed for each block of the list of changed blocks 556 determined by using the snap differential technique described above herein. Thus, in at least one embodiment of the current technique, a list of changed files and directories is identified for backup based on a list of changed blocks determined from evaluating changes between two snapshot copies of the file system by performing a series of steps that maps information.

Figure 11:
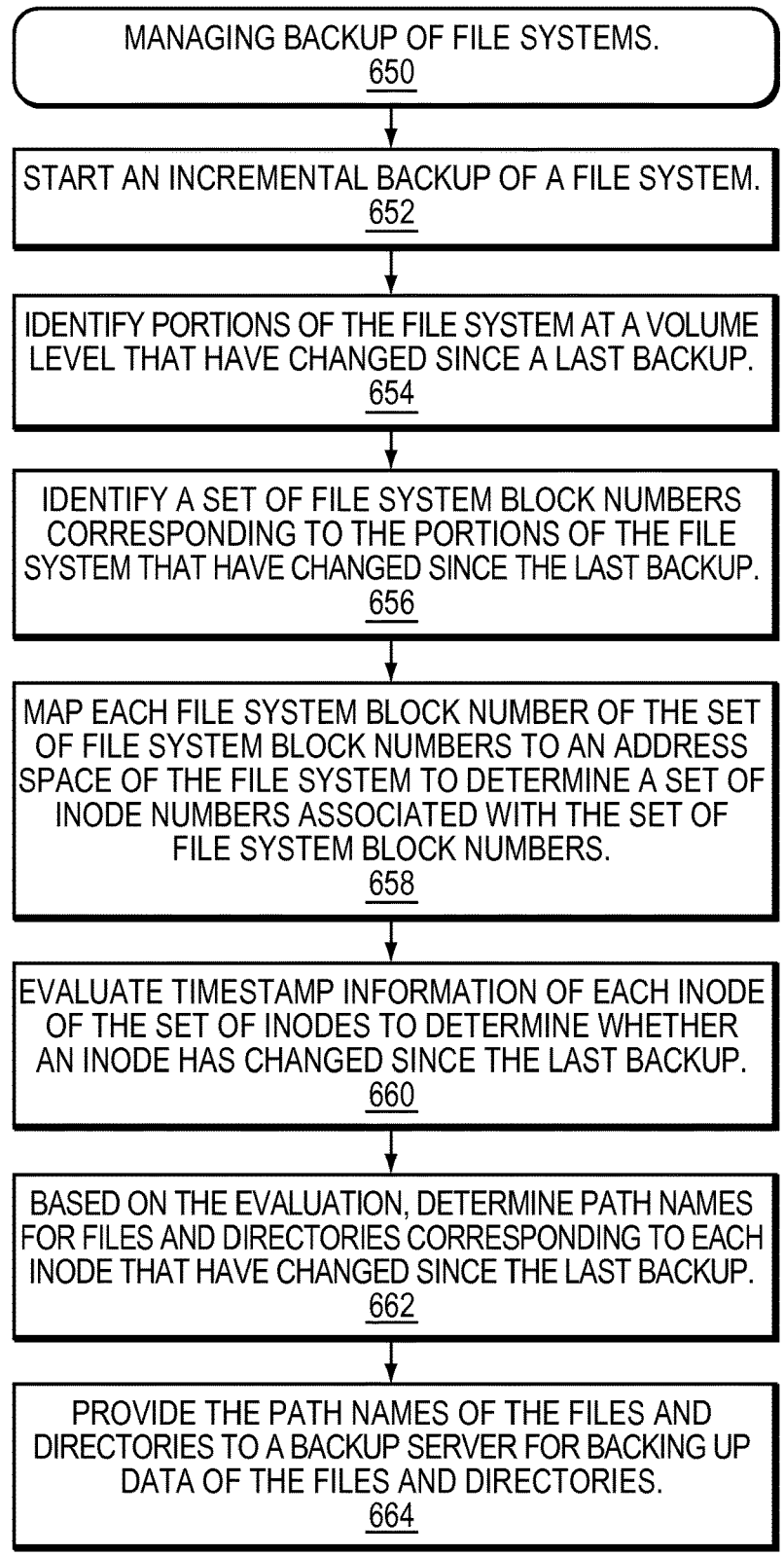
FIG. 11 is a flow diagram illustrating processes that may be used in connection with techniques herein.

Referring to FIG. 11, shown is a more detailed flow diagram illustrating managing backups of file systems. With reference also to FIGS. 1-10, in at least one embodiment of the current technique, backup (e.g., an incremental backup) of file systems in managed in a storage system (step 650). An incremental backup for a file system may be started by a user or a backup scheduler process (step 652). An existing snap differential technique described above herein is used to identify portions of the file system at a volume level that have changed since a last backup (step 654). The portions are identified by comparing changes between two previous snapshot copies of the file system in which one of the snapshot copy may be created before starting the incremental backup if such copy does not already exists. Further, the portions of the file system that have been identified by using snapshot copies are indicated by a list of changed blocks of a volume associated with the file system. Further, each changed block identified by the snap differential technique is mapped to a file system block number (step 656). In at least one embodiment of the current technique, following steps are performed to map a changed block to a file system block number. First, the slice associated with a changed block is identified such that the slice number and the block offset within the slice is identified to determine position of the changed block within such slice where the block offset provides the location of the changed block within such slice. Next, based on the slice number, a slice allocation table maintained by file system mapping layer 550 is evaluated to determine the location of the slice within the logical address space of the file system which is indicated by the offset within the logical address space of the file system. Next, the file offset is added to the block offset determined above herein to determine a file system block number of the changed block. Further, upon determining a set of file system block numbers associated with the changed blocks, each file system block number is mapped to the logical address space of the file system to determine whether each file system block number resides in metadata space allocated within the logical address space (e.g., an inode subspace indicating location of an inode block) (step 658). Further, the set of file system block numbers are mapped to a set of inode blocks where each inode entry in each inode block of the set of inode blocks is evaluated to determine whether the inode represented by such inode entry has changed since the last backup (step 660). Such determination may be made by evaluating timestamp information included in each inode entry. Further, a set of inodes are determined from the set of inode blocks that has changed since the last backup. Further, each inode in the set of inodes is mapped to a file pathname indicating a file or directory that has changed since the last backup (step 662). An inode of file may be mapped to the file pathname of such file using the technique that maps an inode to the pathname described above herein. Further, a list of file pathnames associated with the set of inodes is provided to a backup server for backing up data of the changed files and directories (step 664).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing backing up of file systems, the method comprising:
receiving a request to perform an incremental backup of a file system;
determining a portion of the file system at a volume level that has been changed since a last backup by comparing a first and second snapshot copies of the file system, wherein the file system includes a set of directory hierarchies, each directory hierarchy including a set of directories, each directory of the set of directories including a set of files, wherein the portion of the file system is indicated by blocks of the file system changed since the last backup, wherein the changed blocks are identified based on changes between the first and second snapshot copies of the file system, wherein the first and second snapshot copies indicates two most recent snapshot copies of the file system created prior to starting the incremental backup of the file system, wherein one of the first and second snapshot copies is created prior to performing the incremental backup upon determining that the two most recent snapshot copies do not exist;
based on the changed blocks, determining a set of inodes of the file system changed since the last backup;
based on the determination, determining a list of pathnames for changed files associated with the set of inodes for performing incremental backup of changed files of the file system by avoiding traversing the entire hierarchy of the file system, wherein each inode of the set of inodes is mapped to a pathname for a changed file for determining the list of pathnames, wherein the incremental backup is performed on the changed files; and
providing the list of pathnames for changed files in an ordered arrangement for performing the backup, wherein the ordered arrangement is based on an order in which each changed file appears in a file system hierarchy of the file system.

2. The method of claim 1, wherein the incremental backup is performed on the file system by backing up the changed files.

3. The method of claim 1, wherein the file system includes a set of files, each file associated with an inode, wherein the inode of a file includes metadata of the file.

4. The method of claim 1, wherein the file system is associated with a set of sparse volumes, wherein a sparse volume includes a set of slices, each slice of the set of slices is a logical representation of a subset of physical disk storage.

5. The method of claim 1, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

6. The method of claim 1, further comprising
mapping the portion of a file system changed since the last backup to a list of file system block numbers.

7. The method of claim 6, further comprising:
evaluating each file system block number of the list of file system block numbers to determine whether a file system block number maps to a portion of an address space of the file system, wherein the portion is associated with inodes of the file system; and
based on the evaluation, determining a list of inodes, wherein each inode represents a file associated with a file system block number mapped to the portion of the address space associated with the inodes.

8. A system for use in managing backing up of file systems, the system comprising a processor configured to:
receiving a request to perform an incremental backup of a file system;
determine a portion of the file system at a volume level that has been changed since a last backup by comparing a first and second snapshot copies of the file system, wherein the file system includes a set of directory hierarchies, each directory hierarchy including a set of directories, each directory of the set of directories including a set of files, wherein the portion of the file system is indicated by blocks of the file system changed since the last backup, wherein the changed blocks are identified based on changes between the first and second snapshot copies of the file system, wherein the first and second snapshot copies indicates two most recent snapshot copies of the file system created prior to starting the incremental backup of the file system, wherein one of the first and second snapshot copies is created prior to performing the incremental backup upon determining that the two most recent snapshot copies do not exist;
based on the changed blocks, determine a set of inodes of the file system changed since the last backup;
based on the determination, determine a list of pathnames for changed files associated with the set of inodes for performing incremental backup of changed files of the file system by avoiding traversing the entire hierarchy of the file system, wherein each inode of the set of inodes is mapped to a pathname for a changed file for determining the list of pathnames, wherein the incremental backup is performed on the changed files; and
provide the list of pathnames for changed files in an ordered arrangement for performing the backup, wherein the ordered arrangement is based on an order in which each changed file appears in a file system hierarchy of the file system.

9. The system of claim 8, wherein the incremental backup is performed on the file system by backing up the changed files.

10. The system of claim 8, wherein the file system includes a set of files, each file associated with an inode, wherein the inode of a file includes metadata of the file.

11. The system of claim 8, wherein the file system is associated with a set of sparse volumes, wherein a sparse volume includes a set of slices, each slice of the set of slices is a logical representation of a subset of physical disk storage.

12. The system of claim 8, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

13. The system of claim 8, further comprising
map the portion of a file system changed since the last backup to a list of file system block numbers.

14. The system of claim 13, further comprising:
evaluate each file system block number of the list of file system block numbers to determine whether a file system block number maps to a portion of an address space of the file system, wherein the portion is associated with inodes of the file system; and
based on the evaluation, determine a list of inodes, wherein each inode represents a file associated with a file system block number mapped to the portion of the address space associated with the inodes.

* * * * *